US012756002B2

(12) United States Patent
Kim et al.

(10) Patent No.: US 12,756,002 B2
(45) Date of Patent: Oct. 6, 2026

(54) METHOD FOR ACTIVATION OF LITHIUM SECONDARY BATTERY

(71) Applicant: LG ENERGY SOLUTION, LTD., Seoul (KR)

(72) Inventors: Sang Jih Kim, Daejeon (KR); Nak Gi Sung, Daejeon (KR); Eui Kyung Lee, Daejeon (KR); Suk Hyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 672 days.

(21) Appl. No.: 18/269,487

(22) PCT Filed: Nov. 2, 2022

(86) PCT No.: PCT/KR2022/017064
§ 371 (c)(1),
(2) Date: Jun. 23, 2023

(87) PCT Pub. No.: WO2023/080645
PCT Pub. Date: May 11, 2023

(65) Prior Publication Data

US 2024/0322216 A1 Sep. 26, 2024

(30) Foreign Application Priority Data

Nov. 4, 2021 (KR) ........................ 10-2021-0150214

(51) Int. Cl.
*H01M 10/52* (2006.01)
*H01M 10/04* (2006.01)
*H01M 10/44* (2006.01)
*H01M 10/058* (2010.01)

(52) U.S. Cl.
CPC ..... *H01M 10/0468* (2013.01); *H01M 10/446* (2013.01); *H01M 10/058* (2013.01)

(58) Field of Classification Search
None
See application file for complete search history.

(56) References Cited

U.S. PATENT DOCUMENTS

| | | | |
|---|---|---|---|
| 6,329,789 | B1 | 12/2001 | Gavrilov et al. |
| 11,075,419 | B2 | 7/2021 | Kim et al. |
| 2015/0153420 | A1 | 6/2015 | Adaniya et al. |

(Continued)

FOREIGN PATENT DOCUMENTS

| | | | |
|---|---|---|---|
| CN | 106532131 | A | 3/2017 |
| CN | 106684457 | A | 5/2017 |

(Continued)

OTHER PUBLICATIONS

English translation of CN 109301335 (Year: 2).*

(Continued)

*Primary Examiner* — Yoshitoshi Takeuchi
(74) *Attorney, Agent, or Firm* — Birch, Stewart, Kolasch & Birch, LLP

(57) ABSTRACT

A method of activating a lithium secondary battery includes a pressurization process pressurizing the lithium secondary battery while changing pressure at one or two or more time periods selected from before an activation process, after the activation process, and between activation steps of the activation process.

15 Claims, 5 Drawing Sheets

(56) References Cited

U.S. PATENT DOCUMENTS

| | | | |
|---|---|---|---|
| 2015/0340885 A1 | 11/2015 | Baek et al. | |
| 2016/0261006 A1 | 9/2016 | Ueno et al. | |
| 2018/0309159 A1 | 10/2018 | Hori | |
| 2022/0077491 A1 | 3/2022 | Kim et al. | |
| 2022/0278352 A1 | 9/2022 | Hong et al. | |

FOREIGN PATENT DOCUMENTS

| | | | | |
|---|---|---|---|---|
| CN | 109301335 | * | 2/2019 | .......... H01M 10/058 |
| CN | 109301335 | A | 2/2019 | |
| CN | 111564674 | A | 8/2020 | |
| CN | 111682272 | A | 9/2020 | |
| CN | 113363422 | A | 9/2021 | |
| JP | 2010-9983 | A | 1/2010 | |
| JP | 2015-95334 | A | 5/2015 | |
| JP | 6007980 | B2 | 10/2016 | |
| JP | 2019-21445 | A | 2/2019 | |
| JP | 2019-21510 | A | 2/2019 | |
| JP | 2019-87376 | A | 6/2019 | |
| JP | 2019-145247 | A | 8/2019 | |
| KR | 10-2002-0077365 | A | 10/2002 | |
| KR | 10-2015-0133587 | A | 11/2015 | |
| KR | 10-2016-0132572 | A | 11/2016 | |
| KR | 10-2017-0067042 | A | 6/2017 | |
| KR | 10-2017-0101582 | A | 9/2017 | |
| KR | 10-1830286 | B1 | 2/2018 | |
| KR | 10-1841800 | B1 | 3/2018 | |
| KR | 10-2018-0119130 | A | 11/2018 | |
| KR | 10-2019-0031856 | A | 3/2019 | |
| KR | 10-2124824 | B1 | 6/2020 | |
| KR | 10-2020-0129518 | A | 11/2020 | |
| KR | 10-2021-0090459 | A | 7/2021 | |
| WO | WO 2018/143733 | A1 | 8/2018 | |
| WO | WO 2020/226285 | A1 | 11/2020 | |

OTHER PUBLICATIONS

Extended European Search Report for European Application No. 22890376.1, dated May 21, 2025.

Korean Office Action for Korean Application No. 10-2021-0150214, dated May 2, 2025, with English translation.

Chinese Office Action and Search Report for Chinese Application No. 202280008309.8, dated May 26, 2026, with English translation of the Office Action.

Japanese Office Action for Japanese Application No. 2023-535870, dated Jun. 25, 2024, with English translation.

International Search Report for PCT/KR2022/017064 (PCT/ISA/210) mailed on Feb. 13, 2023.

* cited by examiner

[FIG. 1]
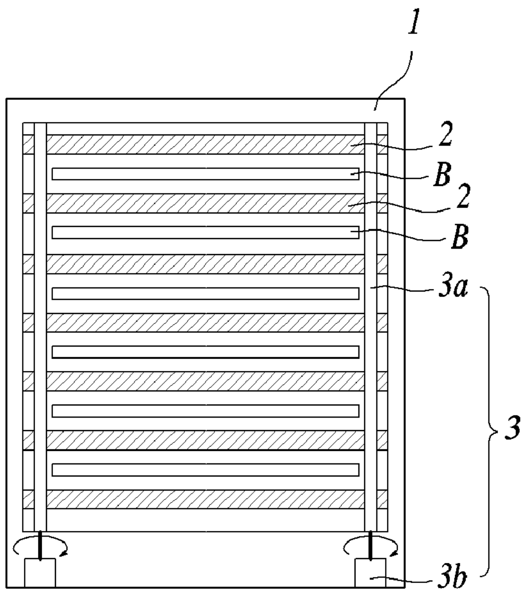
[FIG. 2]
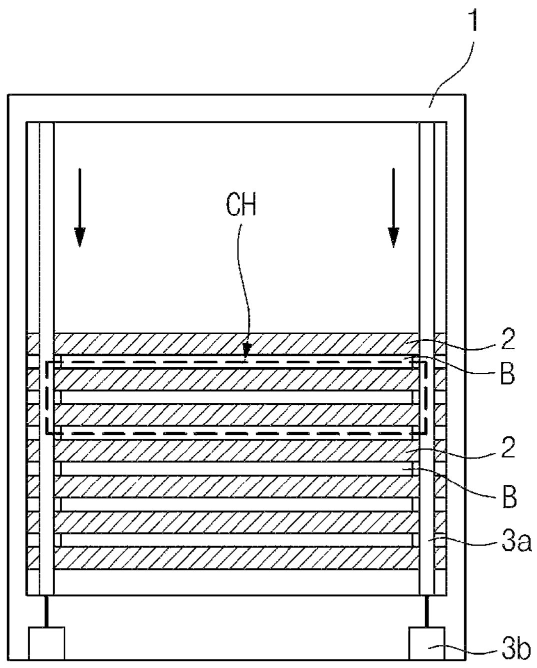

[FIG. 3]
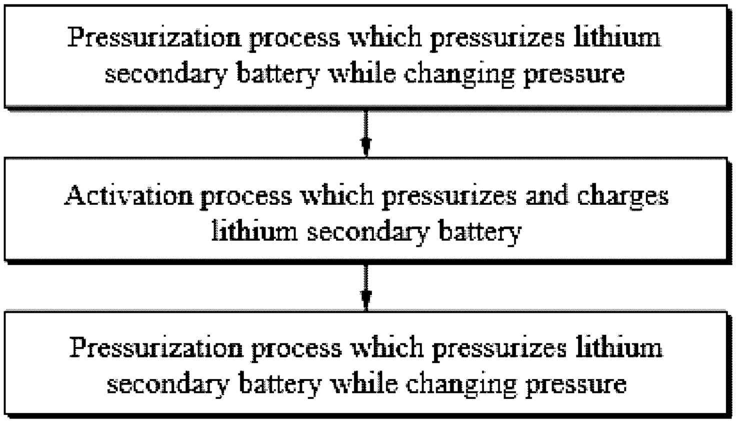
[FIG. 4]
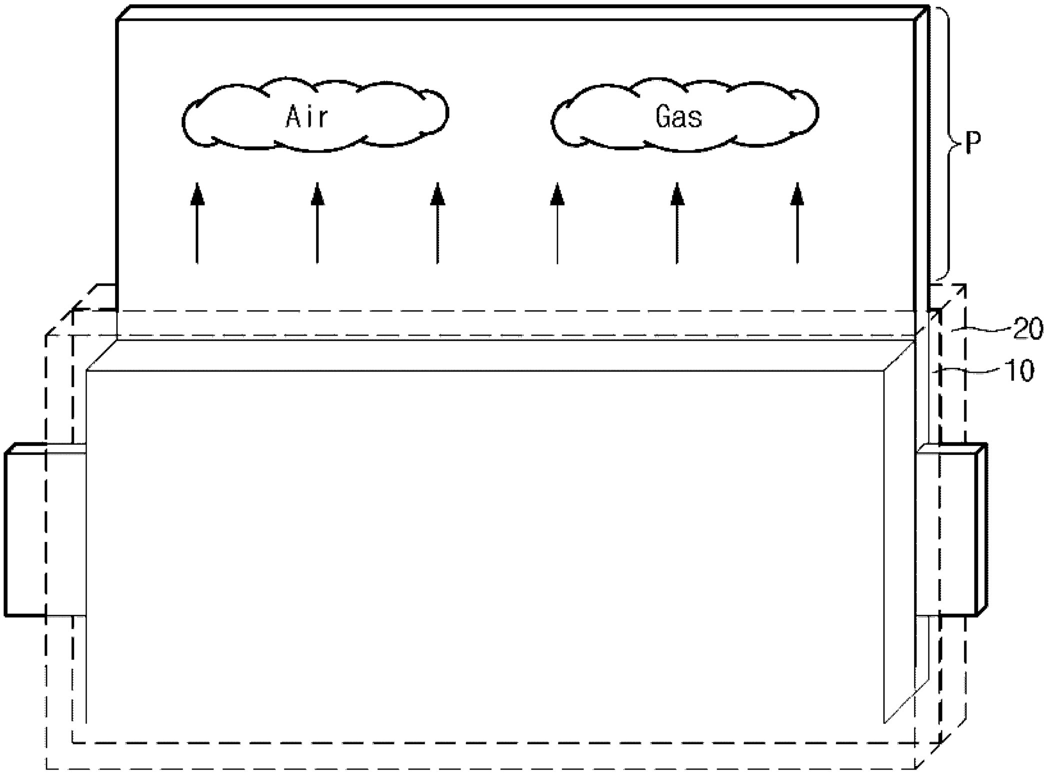

[FIG. 5]
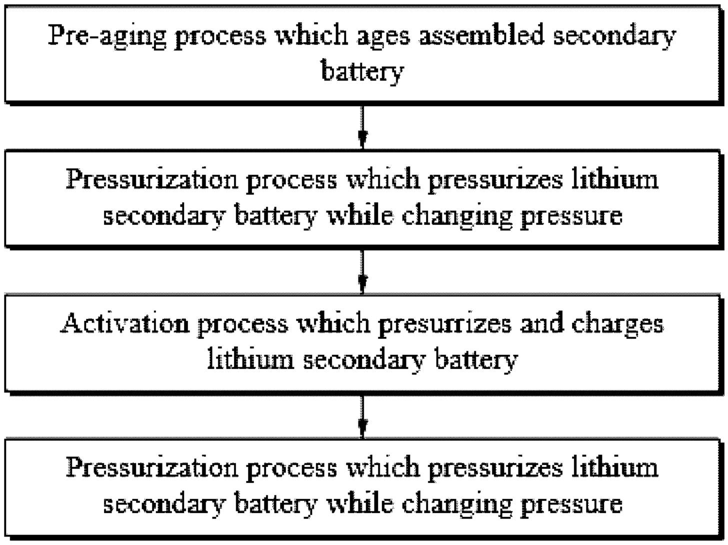
[FIG. 6]
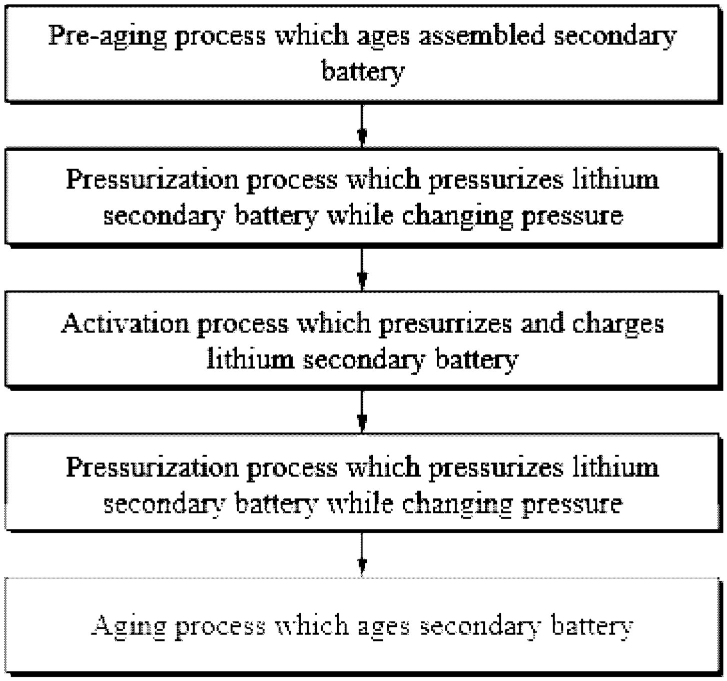

[FIG. 7]
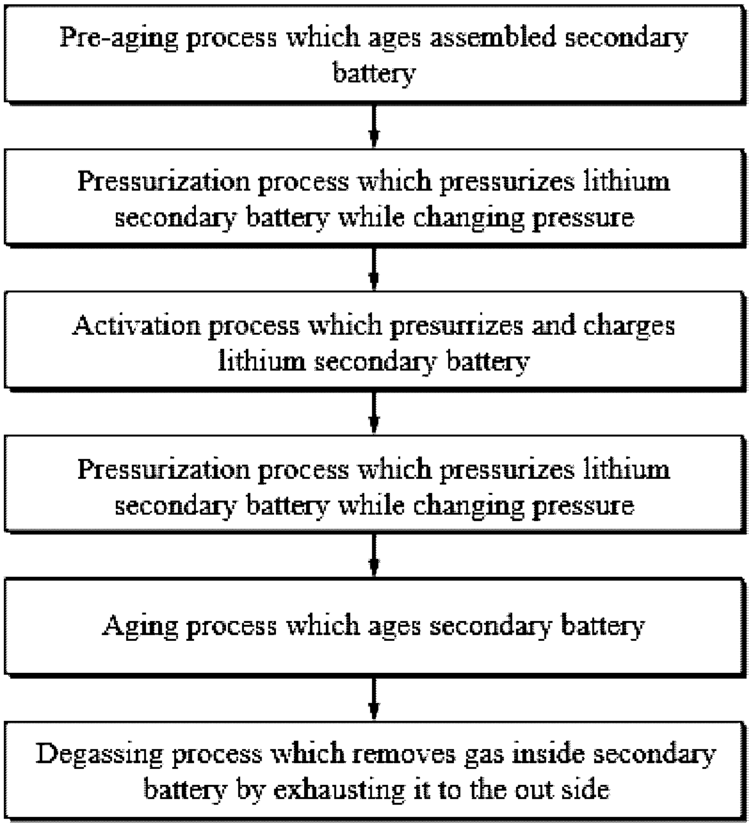

[FIG. 8]
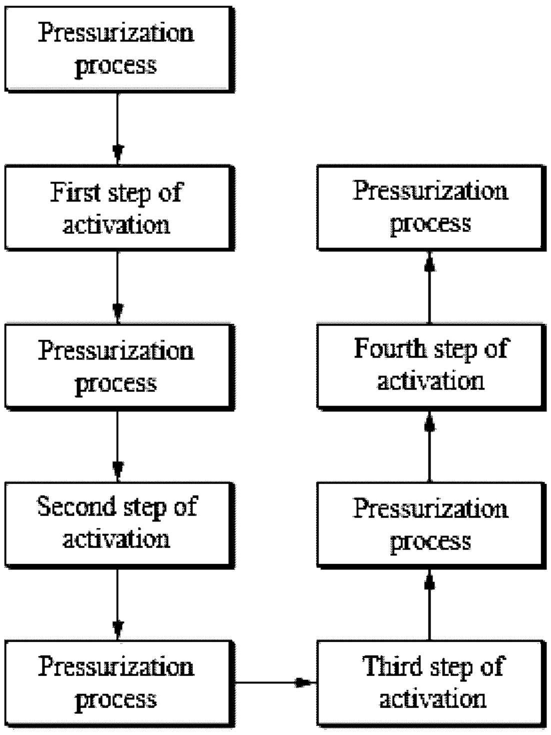

METHOD FOR ACTIVATION OF LITHIUM SECONDARY BATTERY

TECHNICAL FIELD

This application claims the benefit of priority based on Korean Patent Application No. 10-2021-0150214, filed on Nov. 4, 2021, and the entire contents of the Korean patent application are incorporated herein by reference.

The present invention relates to a method for activating a lithium secondary battery, which prevents internal gas generated in an activation process from being trapped.

BACKGROUND ART

Generally, the secondary battery depending on its shape can be classified into a cylindrical, a prismatic, a pouch-type, etc. Among them, a pouch-type secondary battery, because the exterior is made up of exterior materials that are composed of a metal layer(foil) and a synthetic resin multilayer that is coated on the upper and lower surface of the metal layer, light weighting of a battery is possible by significantly reducing the weight of the battery compared to a cylindrical or a prismatic battery which uses a metal can, and a pouch-type battery is drawing a lot of attention as it can be changed into diverse forms.

In such a pouch-type secondary battery, the electrode assembly is stored in a stacked form, an electrode tab and an electrode lead are connected to the electrode assembly, and the electrode lead protrudes from the pouch exterior material. Such electrode lead is supplied with electric power from an external device by electrically connected to the external device through contact.

A pouch-type secondary battery is manufactured through a process of assembling the cell and a process of activating the battery, and in the battery activation process, the secondary battery cell is loaded to a charging and discharging device, and charging and discharging are performed under conditions necessary for activation. As such, the process of performing predetermined charging and discharging using the charging and discharging device for battery activation is called a formation process.

FIG. 1 and FIG. 2 illustrate a device for a formation process. Referring to FIG. 1, the formation device includes a frame (1), pressure plates (2), and driving parts (3: 3*a*, 3*b*). The driving part includes a driving shaft (3*a*) and a driving motor (3*b*).

Inside the frame (1), a plurality of pressure plates (2) is placed, and a secondary battery (B) which will perform a formation process is interposed between the pressure plates (2).

As illustrated in FIG. 1, when the driving shaft (3*a*) rotates by the rotation of the driving motor (3*b*) to cause the plurality of pressure plates (2) engaged therewith to move in one direction, the pressure plates (2) press both sides of the secondary battery (B) as shown in FIG. 2. Compared to a pressureless formation, a pressurizing formation has the advantage of adhering an electrode interface and controlling an expansion of a negative electrode, thereby inducing a uniform activation reaction.

However, even when such a pressurizing formation process is performed, gas in the form of bubbles existing from the injection step or gas generated during the formation process are often not completely removed. In particular, gas in the form of bubbles impedes the movement of lithium ions, causes localized charging non-uniformity, and even causes lithium to precipitate. Therefore, in the activation process, there is a need to develop a technology capable of removing gas more efficiently.

DESCRIPTION OF THE INVENTION

Technical Problem

The present invention is directed to solve the problems of the conventional art, and an object of the present invention is to provide a method for activating a secondary battery, which allows bubbles in an electrolyte solution or gas between electrode layers to be exhausted efficiently.

Technical Solution

A method for activating a lithium secondary battery according to an exemplary embodiment of the present invention includes: an activation process pressurizing and charging the lithium secondary battery, the activation process comprising n number of activation steps, wherein n is an integer of 3 or more, and wherein each of the activation steps has different activation conditions that include one or more selected from a charge end state of charge (SOC), a charging speed (C-rate), and a pressure applied to the lithium secondary battery; and a pressurization process pressurizing the lithium secondary battery while changing the pressure. The pressurization process may be performed during one or more time periods selected from before the activation process, after the activation process, and between the activating steps.

In an exemplary embodiment of the present invention, the pressurization process may include a first pressurizing step pressurizing the lithium secondary battery at a pressure of 0.1 to 1.0 kgf/cm$^2$, and a second pressurizing step pressurizing the lithium secondary battery at a pressure of 2.5 to 7.5 kgf/cm$^2$, and the first pressurization step and the second step of pressurization-pressurization step may be sequentially performed.

In an exemplary embodiment of the present invention, each of the first pressurization step and the second pressurization step may be performed for 0.1 to 10 minutes, and one to five sets may be performed where each set consists of one performance of the first pressurization step and the second pressurization step.

In an exemplary embodiment of the present invention, the pressurization process may be performed before the activation process, after the activation process, and between each of the activation steps.

In an exemplary embodiment of the present invention, the activation process and the pressurization process may be performed at a temperature of 40° C. to 70° C.

In an exemplary embodiment of the present invention, the activation steps include (a) a first activation step in which the pressure applied to the lithium secondary battery during charging is 0.1 kgf/cm$^2$ to 1.0 kgf/cm$^2$ and (b) a second activation step in which the pressure applied to the lithium secondary battery during charging is 2.5 kgf/cm$^2$ to 7.5 kgf/cm$^2$. The first activation step may precede the second activation step.

In an exemplary embodiment of the present invention, the activation steps may include a slow charging activation step in which the charging speed is 0.01 C-rate to 0.5 C-rate, and a fast charging activation step in which the charging speed is 0.6 C-rate to 1.5 C-rate. The slow charging activation step may precede the fast charging activation step.

The activation method according to an exemplary embodiment of the present invention may further include a degassing process removing gas inside the lithium secondary battery by exhausting the gas outside the lithium secondary battery.

The activation steps in an exemplary embodiment of the present invention may include: a first activation step charging the lithium secondary battery below SOC 10%; a second activation step charging the lithium secondary battery which has undergone the first activation step within the range of SOC 10% to 30%; a third activation step charging the lithium secondary battery that has undergone the second activation step within the range of SOC 35% to 50%; and a fourth activation step charging the lithium secondary battery that has undergone the third activation step within the range of SOC more than 50% to 70%.

In an exemplary embodiment of the present invention, in the first activation step and the second activation step, the pressure applied to the lithium secondary battery during charging may be 0.1 $kgf/cm^2$ to 1.0 $kgf/cm^2$, and, in the third activation step and the fourth activation step, the pressure applied to the lithium secondary battery during charging may be 2.5 $kgf/cm^2$ to 7.5 $kgf/cm^2$.

In an exemplary embodiment of the present invention, in the first activation step, the charging speed may be 0.01 C-rate to 0.5 C-rate, and in the second activation step to the fourth activation step, the charging speed may be respectively 0.6 C-rate to 1.5 C-rate.

In an exemplary embodiment of the present invention, the one or more time periods of the pressurization process include:

(i) before the first activation step;

(ii) between the first activation step and the second activation step;

(iii) between the second activation step and the third activation step;

(iv) between the third activation step and the fourth activation step, and (v) after the fourth activation step.

In an exemplary embodiment of the present invention, the activation process and the pressurization process may be performed by a formation device configured to pressurize outer surface-surfaces of the lithium secondary battery.

The activation method according to an embodiment of the present invention may further include a pre-aging process aging the lithium secondary battery before the activation process.

The activation method according to an embodiment of the present invention may further include an aging process aging the lithium secondary battery after the activation process and the pressurization process.

In an exemplary embodiment of the present invention, the charging of the lithium secondary battery may not be performed during the pressurization process.

Advantageous Effects

The activation method according to the present invention includes pressurization process which pressurizes the lithium secondary battery while changing the pressure during one or two or more time periods selected from: before the activation process, after the activation process, and in between the activation processes, preventing internal gas trapped inside the electrode assembly by moving gas in the form of bubbles in the electrolyte solution and gas generated in the activation process to the gas pocket part, thereby improving the battery performance.

BRIEF DESCRIPTION OF DRAWINGS

FIG. 1 and FIG. 2 are schematic diagrams showing a formation device.

FIG. 3 is a flowchart of an activation method according to an exemplary embodiment of the present invention.

FIG. 4 is a conceptual diagram illustrating an effect of an activation method of the present invention.

FIG. 5 is a flowchart of an activation method according to an exemplary embodiment of the present invention.

FIG. 6 is a flowchart of an activation method according to an exemplary embodiment of the present invention.

FIG. 7 is a flowchart of an activation method according to an exemplary embodiment of the present invention.

FIG. 8 is a flowchart of an activation method according to another exemplary embodiment of the present invention.

BEST MODE

Hereinafter, the preferred embodiments of the present invention will be described in detail with reference to the accompanying drawings. Prior to this, the terms or words used in the present specification and claims should not be restrictively interpreted as ordinary meanings or dictionary meanings, but should be interpreted as meanings and concepts consistent with the technical ideas of the present invention on the basis of the principle that an inventor can properly define the concept of a term to describe and explain his or her invention in the best way.

Accordingly, since the embodiments described in the specification and the configurations described in the drawings are only the most preferred embodiments of the present invention, and do not represent all of the technical ideas of the present invention, it should be understood that there may be various equivalents and modifications that can substitute them at the time of filing the present application.

The Activation Method According to the First Embodiment

The activation method according to an exemplary embodiment of the present invention includes an activation process of pressurizing and charging the lithium secondary battery; and a pressurization process which pressurizes the lithium secondary battery while changing the pressure. The activation process consists of n (n is an integer of 3 or more) number of steps of activation, and the steps of activation are set with different activation conditions depending on each step including one or two or more selected from: charge end SOC, charging speed (C-rate), and pressure applied to the battery. In addition, the pressurization process is performed during one or two or more time periods selected from: before the activation process, after the activation process, and between the steps of the activation.

In the activation method of the present invention, in order to prevent the internal gas in the form of bubbles existed from the injection step or gas generated in the activation process to be trapped inside the electrode assembly, the pressurization process is performed during one or two or more time periods selected from: before the activation process, after the activation process, and between the steps of the activation.

FIG. 4 is a conceptual diagram illustrating an effect of an activation method of the present invention. Referring to FIG. 4, as a pair of pressure plates (10, 20) pressurizes both sides of the secondary battery (B) which is disposed therebetween, the electrode layer and the gap between the electrode layer and the separator gets narrower. Consequently, gas in the form of bubbles existing in the electrode assembly, and gas generated in the activation process are pushed and moved from the electrode assembly to a gas pocket part (P).

Thereby, it can minimize a gas trap phenomenon and it is more effective in removing these gases during the degassing process performed in the latter part of the activation process.

The activation process is a step of charging the secondary battery to form an SEI (Solid electrolyte solution interface, hereinafter referred to "SEI") film layer of a negative electrode, and it is a process of charging the assembled secondary battery within a predetermined range with respect to full charge capacity (SOC 100%, SOC; State Of Charge). Here, the predetermined range of the SOC may be SOC 20% to 80%, and more preferably SOC 40% to 70%.

When a lithium secondary battery is performed the activation process, lithium ions derived from lithium transition metal oxides of a positive electrode active layer, a positive electrode additive, etc. contained in a positive electrode move to a carbon electrode of a negative electrode. Since the lithium ions are highly reactive, reacting with a carbon negative electrode, and producing compounds such as $Li_2CO_3$, LiO, and LiOH, etc., and these compounds form an SEI film on the surface of the negative electrode. The SEI film is a nonconductor formed when the amount of ion movement in the battery is increased. When the SEI film is formed, it prevents the lithium ion to react with other substances in the negative electrode during the subsequent charging of the secondary battery, and serves as a function of ion tunnel which only allows lithium ions to pass through. After such SEI film is formed, lithium ions do not react with the negative electrode or other substances, so the amount of lithium ions is reversibly maintained and the charging and discharging of the secondary battery are reversibly maintained, thereby improving the lifespan of the secondary battery. Furthermore, since it is not easily collapsed even when it is left alone at a high temperature or when charging and discharging are performed repeatedly, the change in the thickness of the battery is less likely to occur.

In the activation method of the present invention, the activation process consists of n (n is an integer of 3 or more) number of steps of activation, and the activation steps are respectively set with different activation conditions depending on each step including one or two or more selected from: charge end SOC, charging speed (C-rate), and pressure applied to the battery.

In other words, the activation process of the present invention consists of three or more steps of activation, and each of the steps of activation respectively sets one or two or more activation conditions selected from a group consisting of charge end SOC, charging speed, and pressure. When the activation process is performed while changing the activation conditions for each step, the battery may be charged under an appropriate charging condition according to a charging depth of the battery, thereby enabling a more uniform and effective activation. In addition, the pressurization process can be performed between each step of activation, and when the pressurization process is performed after each step of activation, gas produced in each step of activation may immediately move to the gas pocket part. Thus, it prevents gas being trapped inside the electrode assembly, and it is more effective in gas discharge.

Each of the steps of activation constituting the activation process of the present invention may be performed at a temperature condition higher than the room temperature in order to lower resistance of the electrode. Specifically, each step of activation may be performed in a temperature condition of 40° C. to 70° C., and to be specific, it may be performed in a temperature condition of 40° C. to 60° C., 45° C. to 60° C., 50° C. to 65° C., 50° C. to 60° C., or 52° C. to 58° C., respectively. The temperature may be adjusted through a pressurizing means which pressurizes the battery. For example, the temperature condition may be adjusted by heating the pressure plates that pressurize the outer surface of the battery to a temperature within the above range.

In the present invention, by performing each step of activation under a temperature condition that satisfies the above range, the secondary battery may be charged under a lower resistance condition than that of the positive electrode, thereby the efficiency of each step of activation may be increased and the uniformity of the SEI film which is formed in the initial step of activation may be improved.

Furthermore, the performance time of each step of activation may be performed for 1 minute to 100 minutes respectively. To be specific, it may be performed for 1 minute to 100 minutes: 1 minute to 60 minutes: 1 minute to 40 minutes: 10 to 40 minutes: 20 to 40 minutes; 10 to 30 minutes: 1 to 10 minutes; and 2 to 9 minutes, respectively.

In the activation process of the present invention, in order to pressurize the lithium secondary battery even during charging, a pressurizing means which is capable of pressurizing the outer surface of the lithium secondary battery may be used. FIG. 1 and FIG. 2 illustrate a formation device which pressurizes the secondary battery while charging in the activation process. Referring to these drawings, the formation device used in the activation process includes a frame (1), pressure plates (2), driving parts (3: 3_a_ and 3_b_) and a charging/discharging part (not illustrated). The driving part (3) includes a driving shaft (3_a_) and a driving motor (3_b_).

Inside the frame 1, a plurality of pressure plates (2) is placed, and the secondary battery (B) which will perform the formation process is interposed between the pressure plates. As shown in FIG. 1, when the driving shaft (3_a_) is rotated by the rotation of the driving motor (3_b_) to cause the plurality of pressure plates (2) engaged therewith to move in one direction, the pressure plates (2) press both sides of the secondary battery (B) as shown in FIG. 2. The formation device is configured to pressurize the battery in a state where the lithium secondary battery is interposed between a pair of pressure plates.

Since the formation device includes pressing members such as the pressure plates, it is not only used in the activation process, but also in the pressurization process.

In addition, the activation process of the present invention may include (a) a step of activation in which the pressure of pressurizing the battery during charging is 0.1 to 1.0 kgf/$cm^2$, (b) a step of activation in which the pressure of pressurizing the battery during charging is 2.5 to 7.5 kgf/$cm^2$, and wherein the step of activation of (a) may precede the step of activation of (b) in time. In other words, in the initial step of activation, the battery may be pressurized at 0.1 to 1.0 kgf/$cm^2$, and in the subsequent steps of activation, the battery may be pressurized at 2.5 to 7.5 kgf/$cm^2$.

To ensure that the lithium secondary battery includes an appropriate amount of electrolyte solution to exhibit an excellent performance, the pressure which pressurizes the battery increases as the steps of activation progress. In other words, in the initial state, a low pressure is applied to the lithium secondary battery so that the electrolyte solution is sufficiently impregnated in the electrode, and the high pressure is applied as gas is generated.

The pressure which pressurizes the battery in the initial step of activation of (a) may be 0.1 to 1.0 kgf/$cm^2$, and preferably 0.2 to 0.8 kgf/$cm^2$, and more preferably 0.3 to 0.7 kgf/$cm^2$. The pressure which pressurizes the battery in the step of activation of (b) may be 2.5 to 7.5 $kgf/cm^2$, preferably 3.0 to 7.0 $kgf/cm^2$, and more preferably 3.5 to 6.5 $kgf/cm^2$.

In addition, the activation process of the present invention includes: a slow charging step of activation with 0.01 to 0.5 C-rate; and a fast charging step of activation with 0.6 to 1.5 C-rate. The slow charging step of activation precedes the fast charging step of activation in time. In other words, the electrode in the lithium secondary battery is charged at a relatively low charging speed in the initial step of activation when the electrolyte solution is not sufficiently impregnated in the electrodes of the lithium secondary battery, and the charging speed is increased in the steps of activation after the initial step of activation in order to induce gas generation as the steps of activation progress.

The charging speed in the slow charging step of activation may be 0.01 C-rate to 0.5 C-rate, preferably 0.05 C-rate to 0.35 C-rate, and more preferably 0.1 C-rate to 0.3 C-rate. In addition, the charging speed in the fast charging step of activation may be 0.6 C-rate to 1.5 C-rate, preferably 0.7 C-rate to 1.3 C-rate, more preferably 0.75 C-rate to 1.25 C-rate.

The pressurization process according to the present invention is a process that proceeds separately from the activation process, and in the present invention, it is distinguished from the pressurization that proceeds during the activation process. The pressurization process of the present invention was based on the thought that it is difficult to completely prevent gas from being trapped inside the electrode assembly only by pressurization during the activation process, thus it is a process independent from the activation process.

The pressurization process is a process of pressurizing both sides of the battery, and the bubbles existed in the electrolyte solution and gas generated during the activation process can move from the electrode assembly to the gas pocket part by the pressurization process.

In an exemplary embodiment of the present invention, during the pressurization process, the secondary battery may not be charged. Since the pressurization process is a process of pressurizing the battery to move gas or bubbles in the electrode assembly to the gas pocket part, when charging is performed during the pressurization process, new gas may be generated by the reaction between an electrode and an electrolyte solution, thereby it is preferable not to artificially perform charging during the pressurization process.

The pressurization process of the present invention is performed during one or two or more time periods selected from: before the activation process, after the activation, and between steps of the activations. For example, the activation method of the present invention may proceed in the order of <the pressurization process→the activation process>, or as illustrated in FIG. 3, <the pressurization process→the activation process→the pressurization process>, and it also may proceed in the order of <the pressurization process→the first step of activation→the pressurization process→the second step of activation→the pressurization process→the third step of activation>, and it also may proceed in the order of <the pressurization process→the first step of activation process→the pressurization process→the second step of activation→the pressurization process→the third step of activation process→the pressurization process>.

In a preferred embodiment of the present invention, the pressurization process may be performed before and after the activation process respectively, and may be performed between each n number of steps of activation respectively. In other words, the pressurization process of the present invention may be performed before and after the activation process respectively, and may also be performed between each of the steps of activation.

The pressurization process may be performed at a temperature condition higher than room temperature in order to lower the resistance of the electrode. Specifically, the pressurization process may be performed under a temperature condition of 40° C. to 70° C., more specifically, 40° C. to 60° C., 45° C. to 60° C., 50° C. to 65° C., 50° C. to 60° C. or 52° C. to 58° C. respectively. The temperature may be adjusted through a pressurizing means which pressurizes the battery. For example, the temperature may be adjusted by heating the pressure plates which pressurize the outer surface of the battery within the above range.

The pressurization process includes a first step of pressurization which pressurizes the battery at a pressure of 0.1 to 1.0 $kgf/cm^2$: a second step of pressurization which pressurizes the battery at a pressure of 2.5 to 7.5 $kgf/cm^2$, and the first step of pressurization and second step of pressurization may be sequentially performed. Therefore, by sequentially performing the first step of pressurization and second step of pressurization within one pressurization process, the battery may be pressurized while changing the pressure.

At this time, the first step of pressurization and the second step of pressurization may be performed for 0.1 to 10 minutes or 0.5 to 5 minutes, respectively.

In addition, the pressurization process of the present invention may be performed 1 to 5 sets wherein one set consists of the first step of pressurization and the second step of pressurization. In other words, the pressurization process which consists of first step of pressurization process and the second step of pressurization process is repeated 1 to 5 times. By repeatedly performing low-pressure pressurization and high-pressure pressurization, it can maximize the efficiency of the activation gas removal.

The compression force in the first step of pressurization may be 0.1 to 1.0 $kgf/cm^2$, preferably 0.2 to 0.8 $kgf/cm^2$, and more preferably 0.3 to 0.7 $kgf/cm^2$. The compression force in the second step of pressurization may be 2.5 to 7.5 $kgf/cm^2$, preferably 3.0 to 7.0 $kgf/cm^2$, and more preferably 3.5 to 6.5 $kgf/cm^2$.

FIG. 8 illustrates an activation method according to an exemplary embodiment of the present invention. Referring to FIG. 8, the activation process in an exemplary embodiment of the present invention may include: the first step of activation charging the lithium secondary battery below SOC 10%; the second step of activation charging the lithium secondary battery which has undergone the first step of activation within the range of SOC 10% to 30%; the third step of activation charging the lithium secondary battery that has undergone the second step of activation within the range of SOC 35% to 50%; and the fourth step of activation charging the lithium secondary battery that has undergone the third step of activation within the range of SOC more than 50% to 70%.

The first step of activation is a step of charging below SOC 10%, and the charge end SOC may be below 10%, preferably SOC 1% to SOC 8%, and more preferably SOC 2% to SOC 6%.

The second step of activation is a step of charging the battery until it reaches the range of SOC 10% to 30%, the charge end SOC may be 10% to 30%, and preferably the SOC 12% to SOC 28%, and more preferably the SOC 15% to SOC 25%.

The third step of activation is a step of charging the battery until it reaches the range of SOC 35% to 50%, the charge end SOC may be SOC 35% to 50%, and preferably SOC 38% to SOC 48%, and more preferably SOC 42% to SOC 46%.

The fourth step of activation is a step of charging the battery until it reaches the range of SOC more than 50% to 70%, and the charge end may be SOC more than 50% but to 70%, 53% to 67%, or 55 to 65%.

In addition, the pressurization process may be performed (i) before the first step of activation, (ii) between the first step of activation and second step of activation, (iii) between the second step of activation and third step of activation, (iv) between the third step of activation and the fourth step of activation, (v) after the fourth step of activation, respectively. By performing pressurization process between each of these steps of activation, the gas exhaustion effect may be further maximized.

In one specific example, when the activation process includes four steps, the pressure pressurizing the battery during charging in the first step of activation and the second step of activation may be 0.1 to 1.0 kgf/cm$^2$, respectively. In the third and fourth activation, the pressure pressurizing the battery during charging may be 2.5 to 7.5 kgf/cm$^2$, respectively.

In addition, in the first step of activation, the charging speed may be 0.01 C-rate to 0.5 C-rate, and in the second to fourth step of activation, its charging speed may be 0.6 C-rate to 1.5 C-rate.

Hereinafter, the lithium secondary battery manufactured according to the activation method of the present invention will be described in detail.

The lithium secondary battery of the present invention is manufactured by accommodating an electrode assembly having a structure of positive electrode/separator/negative electrode in a battery case, injecting an electrolyte solution and sealing.

Specifically, an electrode mixture including an electrode active material and a binder is applied to an electrode current collector to manufacture a positive electrode and a negative electrode, respectively, and then the electrode assembly is manufactured by interposing a separator between the positive electrode and the negative electrode.

After accommodating the prepared electrode assembly in a battery case, the electrolyte solution is injected, and the battery case is sealed to assemble a battery.

Such step of assembling the battery is not particularly limited, and may be performed according to a known method.

In addition, the electrode assembly is not particularly limited as long as it has a structure including a positive electrode, a negative electrode, a separator interposed between the positive and negative electrode, for example, it may be a jelly-roll type, a stack type, or a stack/folding type.

The battery case is not particularly limited as long as it is used as an exterior material for packaging a battery, and a cylindrical, prismatic, or pouch type may be used.

When the battery case is a pouch type, an aluminum laminated pouch including an aluminum layer may be used. After injecting the electrolyte solution, the opened part of the aluminum laminated pouch may be sealed by heat welding or heat fusion.

The lithium secondary battery of the present invention includes an electrode assembly having a positive electrode, a negative electrode, a separator disposed between the positive electrode and the negative electrode, and an electrolyte solution.

The positive electrode includes a positive electrode active layer which is manufactured by applying, drying and pressing the positive electrode mixture slurry to the positive electrode current collector. The positive electrode mixture includes a positive electrode active material and a binder, and may further include a positive electrode additive, a conductor, and a filler if necessary.

The positive electrode is a compound capable of reversible intercalation and de-intercalation of lithium, and specifically, it may include a lithium composite metal oxide including lithium and one or more metals such as cobalt, manganese, nickel, or aluminum. More specifically, the lithium composite metal oxide may include one or two or more compounds selected from the group consisting of lithium-manganese-based oxide (e.g. $LiMnO_2$, $LiMn_2O_4$, etc.), lithium-cobalt-based oxide (e.g. $LiCoO_2$, etc.), lithium-nickel-based oxide (e.g. $LiNiO_2$, etc.), lithium-nickel-manganese oxide (e.g. $LiNi_{1-Y}Mn_YO_2$ (here, $0<Y<1$), $LiMn_{2-z}Ni_zO_4$ (here, $0<Z<2$), etc.), lithium-nickel-cobalt-based oxide (e.g. $LiNi_{1-Y1}Co_{Y1}O_2$ (here, $0<Y1<1$), etc.), lithium-manganese-cobalt-based oxide (e.g. $LiCo_{1-Y2}Mn_{Y2}O_2$ (here, $(<Y2<1)$, $LiMn_{2-z1}Co_{z1}O_4$ (here, $0<Z1<2$), etc.), lithium-nickel-manganese-cobalt-based oxide (e.g. $Li(Ni_pCo_qMn_{r1})O_2$ (here, $0<p<1$, $0<q<1$, $0<r1<1$, $p+q+r1=1$) or $Li(Ni_{p1}Co_{q1}Mn_{r2})O_4$ (here $0<p1<2$, $0<q1<2$, $0<r2<2$, $p1+q1+r2=2$), etc.), or lithium nickel manganese cobalt composite oxide such as $Li(Ni_{p2}CO_{q2}Mn_{r3}M_{s2})O_2$ (here M is selected from the group consisting of Al, Fe, V, Cr, Ti, Ta, Mg and Mo; p2, q2, r3 and s2 are atomic fractions of independent elements, respectively, $0<p2<1$, $0<q2<1$, $0<r3<1$, $0<s2<1$, $p2+q2+r3+s2=1$), etc.) etc. With respect to improving the battery capacity and stability, the lithium composite metal oxide may be $LiCoO_2$, $LiMnO_2$, $LiNiO_2$, lithium nickel manganese cobalt oxide (e.g. $Li(Ni_{0.6}Mn_{0.2}Co_{0.2})O_2$, $Li(Ni_{0.5}Mn_{0.3}Co_{0.2})O_2$ or $Li(Ni_{0.8}Mn_{0.1}Co_{0.1})O_2$), lithium nickel cobalt aluminum oxide (e.g. $Li(Ni_{0.8}Co_{0.15}Al_{0.05})O_2$ etc.). Considering the remarkable improvement by controlling the type and content ratio of constituent elements forming the lithium composite metal oxide, the lithium composite metal oxide may be $Li(Ni_{0.7}Mn_{0.15}Co_{0.15})O_2$ or $Li(Ni_{0.8}Mn_{0.1}Co_{0.1})O_2$, etc., or a mixture of one or more thereof.

In addition, the content of the positive electrode active material may be 85 to 99 parts by weight, or 88 to 98 parts by weight, 90 to 97 parts by weight, 92 to 95 parts by weight with respect to 100 parts by weight of positive electrode mixture.

The conductor may be used to improve performance such as electrical conductivity, etc. of the positive electrode, and one or more selected from the group consisting of natural graphite, artificial graphite, carbon black, acetylene black, ketjen black, and carbon fiber may be used. For example, the conductor may include acetylene black.

In addition, the conductor with respect to 100 parts by weight of mixture layer may be included in an amount of 1 to 10 parts by weight, specifically 2 to 8 parts by weight; or may be included in 2 to 6 parts by weight of the conductor.

In addition, the binder may include one or more resins selected from the group consisting of polyvinylidene fluoride-hexafluoropropylene copolymer (PVDF-co-HFP), polyvinylidene fluoride, polyacrylonitrile, polymethylmethacrylate and copolymers thereof. As one example, the binder may include polyvinylidenefluoride.

In addition, the binder with respect to 100 parts by weight of the total mixture may include in an amount of 1 to 10 parts by weight, specifically 1 to 8 parts; or 1 to 6 parts by weight.

Furthermore, the average thickness of the mixture layer is not particularly limited, but specifically, it may be 50 μm to 300 μm, more specifically, 100 μm to 200 μm; 80 μm to 150 μm; 120 μm to 170 μm; 150 μm to 300 μm; 200 μm to 300 μm; or 150 μm to 190 μm.

In addition, the positive electrode having a high conductivity without causing chemical change to the battery may be used as a current collector. For example, stainless steel, aluminum, nickel, titanium, baked carbon, etc. may be used, and in the case of aluminum or stainless steel, ones with the surface coated with carbon, nickel, titanium, silver, etc., may be used. In addition, the current collector may form micro/nano-scaled unevenness on the surface to increase the adhesion strength of the positive electrode active material, and may be able to change into diverse forms such as films, sheets, foils, nets, porous materials, foams, and non-woven fabrics. Furthermore, the average thickness of the current collector may be between 3 to 500 μm considering the conductivity and the total thickness of the manufactured positive electrode.

In addition, the negative electrode of the lithium secondary battery used in the present invention is manufactured by applying, drying, and pressing the negative electrode active material on the negative electrode current collector, and if necessary, it may further selectively include the conductor, organic binder polymer, additive, etc. as the same as the positive electrode.

In addition, the negative electrode active material may include, for example, the carbon and graphite materials such as graphite having a completely layered crystal structure, soft carbon having a graphene structure (a structure in which hexagonal honeycomb planes of carbon are arranged in layers), hard carbon which has the aforementioned structure combined with the amorphous parts, artificial graphite, expanded graphite, carbon fiber, non-graphitizable carbon, carbon black, carbon nanotube, fullerene, and activated carbon, etc.; metal complex oxides such as LixFe2O3 ($0 \leq x \leq 1$), LixWO2 ($0 \leq x \leq 1$), SnxMe1-xMe'yOz (Me: Mn, Fe, Pb, Ge; Me', Al, B, P, Si, elements of Group 1, Group 2, and Group 3 of the periodic table, halogens: $0<x \leq 1$; $1 \leq y \leq 3$; $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, etc.; conductive polymers such as polyacetylene; Li—Co—Ni-based materials; titanium oxides; lithium titanium oxides etc., may be used.

As one example, the negative electrode active material may include both graphite and silicon (Si)-containing particles, as the graphite, it may include at least one or more of natural graphite having a layered crystal structure and artificial graphite having a perovskite structure; silicon (Si)-containing particles are the particles having silicon (Si) as main component of the metal component, and may include silicon (Si) particles, SiO particles, $SiO_2$ particles, or a mixture of one or more thereof.

In this case, the negative electrode active material may include 80 to 95 parts by weight of graphite with respect to 100 parts by weight of the total; and 1 to 20 parts by weight of silicon (Si)-containing particles. The present invention may improve charge capacity per unit mass while reducing lithium consumption and irreversible capacity loss during initial charging/discharging of the battery by adjusting the content of graphite and silicon-containing particles included in the negative electrode active material within the above ranges.

In addition, the negative electrode mixture layer may have an average thickness of 100 μm to 200 μm, and specifically, 100 μm to 180 μm, 100 μm to 150 μm, 120 μm to 200 μm, 140 μm to 200 μm, or 140 μm to 160 μm.

Furthermore, the negative electrode current collector is not particularly limited as long as it does not cause chemical change to the battery and has a high conductivity. For example, copper, stainless steel, nickel, titanium, fired carbon, etc., may be used, in the case of copper or stainless steel, ones with the surface coated with carbon, nickel, titanium, silver, or etc., may be used. In addition, in the same manner as the positive electrode current collector, the negative electrode current collector may form micro/nano-scale unevenness on the surface to strengthen the bonding force with the negative electrode active material, and may be able to change into diverse forms such as films, sheets, foils, nets, porous materials, foams, and non-woven fabrics. In addition, the average thickness of the negative electrode current collector may be in the range of 3 to 500 μm considering the conductivity and the total thickness of the manufactured negative electrode.

In addition, the separator is interposed between the positive electrode and the negative electrode, and an insulating thin film having a high ion permeability and mechanical strength is used. The separator is not particularly limited as long as it is commonly used in the art, but to be specific, a chemically resistant and hydrophobic polypropylene: a glass fiber; or a sheet or a non-woven fabric made of polyethylene, etc. may be used. In some cases, the composite separator in which inorganic particles/organic particles are coated with an organic binder polymer may be used on a porous polymer substrate such as a sheet or a nonwoven fabric. When a solid electrolyte such as a polymer, etc. is used as the electrolyte, the solid electrolyte may also serve as the separator. In addition, the average pore diameter of the separator is 0.01 to 10 μm, and the average thickness may be 5 to 300 μm.

The electrolyte may include an organic solvent, a lithium salt, and an additive.

The organic solvent is not limited as long as decomposition due to an oxidation reaction or the like can be minimized during the charging/discharging process of the battery. For example, it may be a cyclic carbonate, a linear carbonate, an ester, an ether or a ketone, etc. These may be used alone, or two or more of them may be used in combination.

Among the above-mentioned organic solvents, carbonate organic solvents may be preferably used. The representative examples of cyclic carbonates are ethylene carbonate (EC), propylene carbonate (PC) and butylene carbonate (BC), and the representative examples of linear carbonates are dimethyl carbonate (DMC), diethyl carbonate (DEC), dipropyl carbonate (DPC), ethylmethyl carbonate (EMC), methylpropyl carbonate (MPC) and ethylpropyl carbonate (EPC).

Lithium salts commonly used in electrolytes of lithium secondary batteries such as $LiPF_6$, $LiAsF_6$, $LiCF_3SO_3$, $LiN(CF_3SO_2)_2$, $LiBF_4$, $LiBF_6$, $LiSbF_6$, $LiN(C_2FsSO_2)_2$, $LiAlO_4$, $LiAlCl_4$, $LiSO_3CF_3$ and $LiClO_4$, etc., may be used for the lithium salt without limitation, and they may be used alone, or two or more may be used in combination.

In addition, the electrolyte solution further includes an additive. For example, any one or a mixture of two or more selected from the group consisting of vinylene carbonate, vinylethylene carbonate, fluoroethylene carbonate, cyclic sulfite, saturated sultone, unsaturated sultone, acyclic sulfone, lithium oxalyl difluoroborate (LiODFB), and derivatives thereof may be used as the additive in order to stably form an SEI film, but it is not limited thereto.

The Activation Method According to the Second Embodiment

FIG. 5 illustrates an activation method according to the second embodiment of the present invention. Referring to FIG. 5, in the activation method of the present invention, prior to the pressurization process and the activation process, a pre-aging process of aging the assembled secondary battery may be further included. Regarding the activation method according to the second embodiment, as described above, the activation process may consist of three or more steps of activation, and since the starting point of the pressurization process is the same as mentioned above, further detailed descriptions will be omitted.

The pre-aging process is a process of aging the battery so that the electrolyte solution is sufficiently impregnated in the electrode assembly. When the assembly of the secondary battery is completed, a pre-aging process, which stabilizes the secondary battery injected with the electrolyte by leaving the secondary battery at room temperature for a certain period of time, may be performed so that the electrolyte solution injected into the secondary battery is sufficiently wetted inside the electrode assembly.

More specifically, when the secondary battery is charged, if electrons are charged after moving to the negative electrode along a wire, lithium ions are intercalated to the negative electrode to achieve a charge neutrality. At this time, lithium ions can be intercalated at the part where the electrolyte is impregnated, where the ion migration path is maintained (wetting area), but intercalation is relatively difficult at the electrolyte non-wetting area. Therefore, through the pre-aging process, the battery can be aged in an environment having a constant humidity and temperature so that the electrolyte solution can be well impregnated into the positive and negative electrodes.

In one specific example, the time required for the pre-aging process may be specifically 3 hours to 72 hours, 6 hours to 60 hours, 12 hours to 48 hours. This may be appropriately adjusted according to the material of the positive electrode, the negative electrode and the electrolyte solution, and the designed capacity or the like of the secondary battery.

In addition, the pre-aging temperature may be performed at room temperature condition of 18° C. to 28° C., specifically 19° C. to 27° C., more specifically 20° C. to 26° C., and even more specifically 21° C. to 25° C., but it is not necessarily limited thereto, and may be changed according to the characteristics of a battery to be designed.

FIG. 6 illustrates an activation method according to an exemplary embodiment of the present invention. Referring to FIG. 6, the activation according to an exemplary embodiment of the present invention may further include an aging process of a secondary battery after the activation process and the pressurization process.

The aging process is a process of aging the secondary battery under various conditions in order to accelerate the stabilization of the SEI film formed through the activation process.

In the aging process, a room temperature aging process which is aging the secondary battery for a predetermined time at room temperature may be performed, and depending on the purpose, a high-temperature aging may be performed instead of a room temperature aging, or both room temperature aging and high temperature aging may be performed. The high-temperature aging is a process of aging a battery in a high temperature environment, and it may accelerate the stabilization of the SEI film, the high temperature aging and room temperature aging processes may be sequentially performed on the initially charged battery.

In one specific example, the high-temperature aging may be performed at a temperature of 50° C. to 100° C., and preferably 50° C. to 80° C. The high-temperature aging may be performed for 1 hour to 30 hours, and preferably 2 hours to 24 hours.

In one specific example, the room temperature aging may be performed at a temperature of 18° C. to 28° C., specifically 19° C. to 27° C., more specifically 20° C. to 26° C., and even more specifically 21° C. to 25° C. The room temperature aging may be performed for 12 hours to 120 hours, or 18 hours to 72 hours.

FIG. 7 illustrates an activation method according to an embodiment of the present invention. Referring to FIG. 7, the activation method of the present invention may further include a degassing process in addition to the activation process and the pressurization process. The degassing process is a process which removes gas inside the secondary battery by exhausting it to the outside, specifically, it is a process of removing internal gas trapped inside the gas pocket part by exhausting it to the outside of the battery.

The pressurization process is a process of pressurizing the battery to move bubbles or gas of the electrode assembly to the gas pocket part. The pressurization process has no effect of exhausting internal gas to the outside, but since the degassing process exhaust internal gas to the outside of the battery, there is a difference between the pressurization process and the degassing process.

The degassing process may be performed after the activation and the pressurization process, and FIG. 7 illustrates an embodiment in which the degassing process is performed after the pressurization process and the aging process. Alternatively, the degassing process may be performed between the last pressurization process and the aging process.

The degassing process may employ various degassing technology published at the time of filing of the present invention. For example, the degassing process may be performed by cutting a part of the gas pocket part, exhausting internal gas through the cut part to the outside, and then sealing the cut part. However, since such a degassing technology is widely known to those skilled in the art, further detailed descriptions will be omitted.

In the activation method of the present invention, the secondary battery is completely discharged to near SOC 0%, and then a full charging and discharging process which charges the discharged battery to 95% (SOC 95%) or more of the designed capacity may be performed. The full charging and discharging process may be performed once or repeated two or more times.

In one specific example, in the method for activating a secondary battery according to the present invention, an additional aging process may be further performed after the full discharging and charging process. The additional aging process is a process which stabilizes the secondary battery, and it may be performed at room temperature or high temperature, and may be specifically performed for 1 to 21 days. In order to sort out low-voltage detective batteries that voltage drops to a range exceeding the self-discharge of the battery, the additional aging process may include a monitoring (OCV tracking) process which includes a process of measuring the open circuit voltage (OCV) of the battery at regular time intervals.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Preparation Example: Preparing a Lithium Secondary Battery

A slurry for a positive electrode mixture layer was prepared by mixing 95 parts by weight of $LiNi_{0.8}Co_{0.1}Mn_{0.1}O_2$ serving as a positive electrode active material, 0.9 parts by weight of $Li_6Co_{0.7}Zn_{0.3}O_4$ serving as a positive electrode additive, 1.6 parts by weight of PVdf serving as a binder, and 2.5 parts by weight of polyvinylidene fluoride (PVdF) serving as a conductor into a N-methylpyrrolidone (NMP) solvent. The slurry for the mixture layer was applied to an aluminum foil, dried, and then roll pressed to form a positive electrode having a positive electrode mixture layer (average thickness: 130 μm).

A slurry for a negative electrode mixture was prepared by mixing 85 parts by weight of natural graphite serving as a carbon active material, 5 parts by weight of SiO (silicon oxide) serving as a silicon active material, 6 parts by weight of carbon black serving as a conductor, and 4 parts by weight of PVDF serving as a binder into a N-methylpyrrolidone solvent, which was then applied to a copper foil to form a negative electrode having a negative electrode mixture layer (average thickness: 180 μm).

An electrode assembly was prepared by disposing and laminating a separator (thickness: approximately 16 μm) made of a porous polyethylene (PE) film between each prepared positive and negative electrode. After disposing the electrode assembly inside the battery case and injecting the electrolyte solution inside the case, the lithium secondary battery was prepared by leaving the secondary battery at room temperature for three days so that the electrolyte solution is sufficiently impregnated in the electrode assembly. A battery was prepared by injecting an electrolyte solution in which 1M LiPF6 is dissolved in an organic solvent in which ethereal carbonate (EC) and ethyl methyl carbonate (EMC) are mixed in a composition of 3:7 (volume ratio).

Example 1

The assembled lithium secondary battery of the preparation example was prepared, pre-aged by aging at room temperature of 25° C. for 24 hours. In addition, the pressurization process and the steps of activation were performed 5 times in the order shown in FIG. 8 to the pre-aged secondary battery. After ending the last pressurization process, a degassing was performed to exhaust gas inside the battery to the outside by forming a through hole in the gas pocket part, and the area around the through-hole was cut and the battery was resealed.

At this time, the conditions of the pressurization process and the charging speed, the charge end SOC, and the pressing condition of each step of activation are as follows.

TABLE 1

| | |
|---|---|
| pressurization process | At a temperature of 55° C., three sets of a first step of pressurization which pressurizes at a pressure of 0.5 $kgf/cm^2$ for 1 minute and a second step of pressurization which pressurizes at a pressure of 5.0 $kgf/cm^2$ for 1 minute are performed repeatedly. |
| first step of pressurization | Temperature: 55° C., Charging speed: 0.2 C-rate<br>Charge end SOC 3%<br>Compression force: 0.5 $kgf/cm^2$ |
| pressurization process | Same as the above pressurization process |
| second step of pressurization | Temperature: 55° C., Charging speed: 1.0 C-rate<br>Charge end SOC 17%<br>Compression force: 0.5 $kgf/cm^2$ |
| pressurization process | Same as the above pressurization process |
| third step of pressurization | Temperature: 55° C., Charging speed: 1.0 C-rate<br>Charge end SOC 45%<br>Compression force: 5.0 $kgf/cm^2$ |
| pressurization process | Same as the above pressurization process |
| fourth step of pressurization | Temperature: 55° C., Charging speed: 1.0 C-rate<br>Charge end SOC 60%<br>Compression force: 5.0 $kgf/cm^2$ |
| pressurization process | Same as the above pressurization process |

Comparative Example

The activation of the battery was performed in the same manner as in Example 1, except that the 5 times of pressurization process was not performed.

Experimental Example: Observation of Lithium Precipitation after 100 Cycles

A charging under a constant current/constant voltage condition charging up to 4.35V at 0.8 C-rate and a 0.05 C cut-off were conducted to the secondary batteries manufactured in Examples and Comparative Examples, and then they were discharged to 0.5 C 3.0V. Subsequently, by letting a constant current/constant voltage condition charging up to 4.3V at 0.8 C rate and a 0.05 C cut-off charging followed by a discharge at 0.5 C 3.0V in room temperature as one cycle, 100 cycles were conducted, and the battery was disassembled to observe whether the lithium precipitation has taken place or not. As a result, the lithium was not precipitated in the battery of Example, but lithium was precipitated in the battery of Comparative Example.

The invention claimed is:

1. A method for activating a lithium secondary battery, comprising:

an activation process pressurizing and charging the lithium secondary battery, the activation process comprising n number of activation steps, wherein n is an integer of 3 or more, and wherein each of the activation steps has different activation conditions that include one or more selected from a charge end state of charge (SOC), a charging speed (C-rate), and a pressure applied to the lithium secondary battery; and a pressurization process pressurizing the lithium secondary battery while changing a pressure, the pressurization process occurring during one or more time periods selected from before the activation process, after the activation process, and between the activation steps, wherein the pressurization process comprises:

a first pressurization step pressurizing the lithium secondary battery at a pressure of 0.1 $kgf/cm^2$ to 1.0 $kgf/cm^2$; and a second pressurization step pressurizing the lithium secondary battery at a pressure of 2.5 $kgf/cm^2$ to 7.5 $kgf/cm^2$, wherein the first pressurization step and the second pressurization step are sequentially performed.

2. The method for activating a lithium secondary battery of claim 1, wherein each of the first pressurization step and the second pressurization step are performed for 0.5 minutes to 5 minutes, and wherein one to five sets are performed, each set consisting of one performance of the first pressurization step and the second pressurization step.

3. The method for activating a lithium secondary battery of claim 1, wherein the pressurization process is performed before the activation process, after the activation process, and between each of the activation steps.

4. The method for activating a lithium secondary battery of claim 1, wherein the activation process and the pressurization process are performed at a temperature of 40° C. to 70° C.

5. The method for activating a lithium secondary battery of claim 1, wherein the activation steps further include:

a slow charging activation step with a charging speed of 0.01 C-rate to 0.5 C-rate; and a fast charging activation step with a charging speed of 0.6 C-rate to 1.5 C-rate, and wherein the slow charging activation step precedes the fast charging activation step.

6. The method for activating a lithium secondary battery of claim 1, further comprising a degassing process removing gas inside of the lithium secondary battery by exhausting the gas outside the lithium secondary battery.

7. The method for activating a lithium secondary battery of claim 1, wherein the activation process and the pressurization process are performed by a formation device configured to pressurize outer surfaces of the lithium secondary battery.

8. The method for activating a lithium secondary battery of claim 1, further comprising a pre-aging process aging the lithium secondary battery before the activation process.

9. The method for activating a lithium secondary battery of claim 1, further comprising an aging process aging the lithium secondary battery after the activation process and the pressurization process.

10. The method for activating a lithium secondary battery of claim 1, wherein charging of the lithium secondary battery is not performed in the pressurization process.

11. A method for activating a lithium secondary battery, comprising:

an activation process pressurizing and charging the lithium secondary battery, the activation process comprising n number of activation steps, wherein n is an integer of 3 or more, and wherein each of the activation steps has different activation conditions that include one or more selected from a charge end state of charge (SOC), a charging speed (C-rate), and a pressure applied to the lithium secondary battery; and a pressurization process pressurizing the lithium secondary battery while changing a pressure, the pressurization process occurring during one or more time periods selected from before the activation process, after the activation process, and between the activation steps, wherein the activation steps include:

a first activation step in which a pressure applied to the lithium secondary battery during charging is 0.1 $kgf/cm^2$ to 1.0 $kgf/cm^2$; and a second activation step in which the pressure applied to the lithium secondary battery during charging is 2.5 $kgf/cm^2$ to 7.5 $kgf/cm^2$, wherein the first activation step precedes the second activation step.

12. A method for activating a lithium secondary battery, comprising:

an activation process pressurizing and charging the lithium secondary battery, the activation process comprising n number of activation steps, wherein n is an integer of 3 or more, and wherein each of the activation steps has different activation conditions that include one or more selected from a charge end state of charge (SOC), a charging speed (C-rate), and a pressure applied to the lithium secondary battery; and a pressurization process pressurizing the lithium secondary battery while changing a pressure, the pressurization process occurring during one or more time periods selected from before the activation process, after the activation process, and between the activation steps, wherein the activation steps include:

a first activation step charging the lithium secondary battery to below SOC 10%;

a second activation step charging the lithium secondary battery which has undergone the first activation step to SOC 10% to 30%;

a third activation step charging the lithium secondary battery which has undergone the second activation step to SOC 35% to 50%; and a fourth activation step charging the lithium secondary battery which has undergone the third activation step to SOC more than 50% to 70%.

13. The method for activating a lithium secondary battery of claim 12, wherein, in the first activation step and the second activation step, a pressure applied to the lithium secondary battery during charging is 0.1 $kgf/cm^2$ to 1.0 $kgf/cm^2$, and wherein, in the third activation step and the fourth activation step, a pressure applied to the lithium secondary battery during charging is 2.5 $kgf/cm^2$ to 7.5 $kgf/cm^2$.

14. The method for activating a lithium secondary battery of claim 12, wherein in the first activation step, a charging speed is 0.01 C-rate to 0.5 C-rate, and in the second activation step to the fourth activation step, a charging speed is 0.6 C-rate to 1.5 C-rate.

15. The method for activating a lithium secondary battery of claim 12, wherein the one or more time periods of the pressurization process is performed include:

(i) before the first activation step;

(ii) between the first activation step and the second activation step;

(iii) between the second activation step and the third activation step;

(iv) between the third activation step and the fourth activation step; and (v) after the fourth activation step.

* * * * *